Dec. 19, 1933.          J. K DIAMOND          1,940,297
                         LINK BELT
                      Filed Jan. 29, 1931

INVENTOR
James K. Diamond
BY
Chappell & Earl
ATTORNEYS

Patented Dec. 19, 1933

1,940,297

UNITED STATES PATENT OFFICE 1,940,297

LINK BELT

James K. Diamond, Grand Rapids, Mich., assignor to Clipper Belt Lacer Company, Grand Rapids, Mich., a corporation of Michigan Application January 29, 1931. Serial No. 511,998

11 Claims. (Cl. 74—64)

The main object of this invention is to provide a link belt of the V type in which the individual links may be readily assembled in a belt of the desired length and one which has large pulling capacity but is at the same time very durable.

A further object is to provide a link belt having these advantages which is very economical.

Objects pertaining to details and economies of my invention will definitely appear from the description to follow. The invention is defined in the claims.

A structure which embodies the features of my invention is clearly illustrated in the accompanying drawing, in which.

Figure 1:
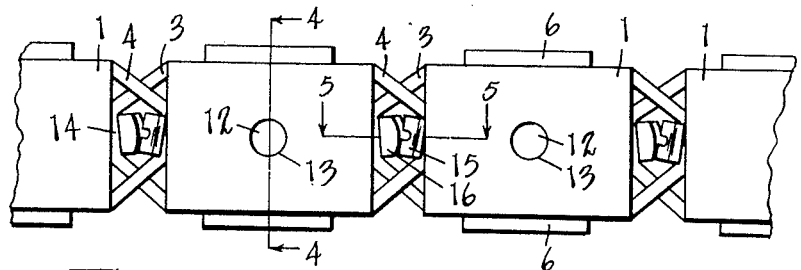
Fig. 1 is a fragmentary side elevation of a link belt embodying the features of my invention.
Figure 2:
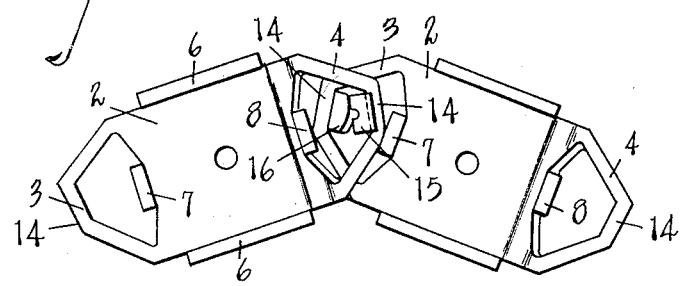
Fig. 2 is a side elevation of a pair of links in flexed relation, the facing members being omitted.
Figure 3:
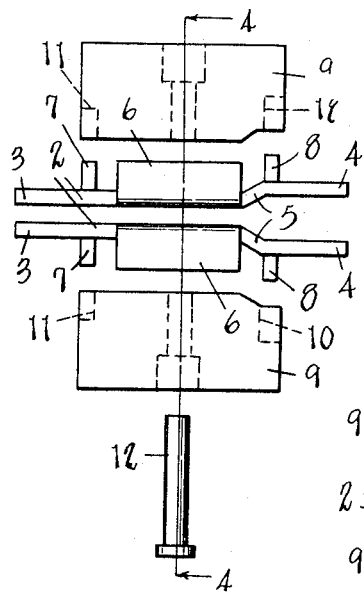
Fig. 3 is a plan view of the parts of a link in disassembled relation.

Referring to the drawing, the belt is made up of a plurality of links designated generally by the numeral 1, each link comprising a pair of body members 2 preferably formed as sheet metal stampings and having coupling loops 3 and 4 at the ends thereof. The coupling loops 4 are outwardly offset at 5 to receive the coupling members 3 of an adjacent link between them.

These body members have side flanges 6 on their longitudinal edges and outwardly projecting lugs 7 and 8 at their ends. The block-like facing members 9 are preferably of a rubber composition arranged between the flanges 6 and the lugs 7 and 8, the facing members having recesses 10 for the lugs 8 and recesses 11 for the lugs 7.

Figure 4:
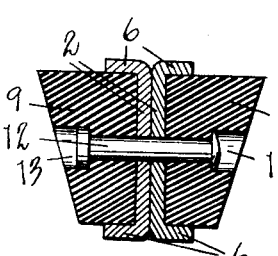
Fig. 4 is a transverse section on line corresponding to line 4—4 of Figs. 1 and 3 with the parts assembled, the rivet being shown in full lines.
Figure 6:
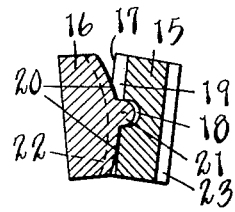
Fig. 6 is a detail central section through one of the coupling pins on a line corresponding to line 6—6 of Fig. 7.

Rivets 12 arranged through the facing members and the body members secure the parts together, the facing members having countersinks 13 therein for the heads of the rivets. The faces of the facing members are converged inwardly as shown in Fig. 4, these faces being the friction surfaces in a belt of the V type. The loops 4 have converging arm portions and the bights or ends 14 of the loops being straight.

The coupling pins comprise a pair of coacting members 15 and 16, the member 15 having a flat face 17 with a longitudinal groove 18 therein, and a transverse recess 19 disposed centrally of the face 17. The member 16 has curved segmental face portions 20 which are in rocking engagement with the bearing face of the member 15.

The member 16 has a longitudinal tongue 21 coacting with the groove 18 to support the members against relative transverse sliding movement. The curved segmental portion 20 has a raised central portion 22 on its bearing face coacting with the recess 23 on its rear side which engages with the loop and prevents longitudinal movement of the member 15 in the loop, see Fig. 5.

Figure 5:
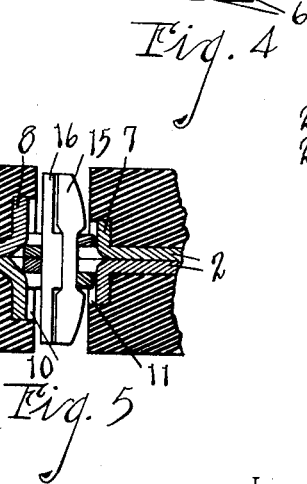
Fig. 5 is a fragmentary longitudinal section on line 5—5 of Fig. 1.
Figure 7:
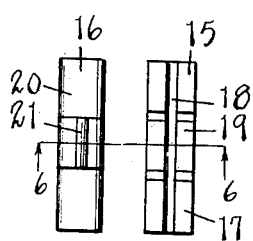
Fig. 7 is a face view of a pair of coacting pin members.

The member 15 is tapered toward each end as shown in Fig. 5 to facilitate engagement. With the pin members in engagement, as shown, there is no bearing or rotating relation between the parts but merely a rocking relation, and they are effectively supported against transverse and longitudinal sliding movement. In the event of the facing blocks becoming worn they may be readily renewed or a new link may be easily inserted.

The facing blocks are very firmly held in position and the belt is capable of transmitting heavy loads when made of quite light material.

I have illustrated and described my improvements in an embodiment which I consider very practical. I have not attempted to illustrate certain other embodiments or adaptations as it is believed that this disclosure will enable those skilled in the art to embody or adapt my improvements as may be desired.

Having thus described my invention what I claim as new and desire to secure by Letters Patent is:

1. In a link, the combination of a pair of body members disposed back to back and having integral coupling loops at each end, the bight portions of the loops being straight, the coupling loops at one end being outwardly offset to receive the coupling loops of an adjacent link between them, said body members having outwardly projecting side flanges on the longitudinal edges thereof and outwardly projecting end lugs, facings of resilient material arranged between said flanges of said body members, the ends of said facings being recessed to receive the said end lugs, and rivets securing said body members and facing members together, the ends of the rivets being countersunk in said facings, and the faces of said facing members being converged inwardly.

2. In a link belt, the combination of a plurality of coacting links comprising a pair of body members disposed back to back and having integral coupling loops at each end, the coupling loops at one end being outwardly offset to receive the coupling loops of an adjacent link between them, said body members having outwardly projecting side flanges on the longitudinal edges thereof and outwardly projecting end lugs, facings of resilient material arranged between said flanges of said body members, the ends of said facings being recessed to receive the said end lugs, means securing body members and facing members together, and coupling means coacting with said loops.

3. In a link belt, the combination of a plurality of coacting links comprising a pair of body members disposed back to back and having integral coupling loops at each end, the bight portions of the loops being straight, the coupling loops at one end being spaced to receive the coupling loops of an adjacent link between them, facings secured upon the sides of said body members, and coupling pins each comprising a pair of coacting members in supporting engagement with the outer ends of said coupling loops to swing therewith, one of said pin members having a flat bearing face with a transverse recess therein and a central longitudinal groove, the other having a coacting grooved bearing face and being provided with a central portion coacting with said recess and a longitudinal rib coacting with said groove, one of said pin members having a central transverse coupling loop engaging recess on its rear side and being tapered toward each end from said recess.

4. In a link belt, the combination of a plurality of coacting links comprising a pair of body members disposed back to back and having integral coupling loops at each end, the coupling loops at one end being spaced to receive the coupling loops of an adjacent link between them, facings secured upon the sides of said body members, and coupling pins, each comprising a pair of coacting members in supporting engagement with the outer ends of said coupling loops to swing therewith, one of said pin members having a flat bearing face with a transverse recess therein and a central longitudinal groove, the other having a coacting grooved bearing face and being provided with a central portion coacting with said recess and a longitudinal rib coacting with said groove.

5. In a link belt, the combination of a plurality of coacting links comprising a pair of body members disposed back to back and having integral coupling loops at each end, the coupling loops at one end being spaced to receive the coupling loops of an adjacent link between them, facings secured upon the sides of said body members, and coupling pins, each comprising a pair of coacting members in supporting engagement with the outer ends of said coupling loops to swing therewith, one of said pin members having a central transverse coupling loop engaging recess on its rear side and being tapered toward each end from said recess.

6. In a link belt, the combination of a plurality of coupling links having coacting coupling loops at the ends thereof, and coupling pins comprising a pair of coacting members in supporting engagement with the outer ends of said coupling loops to swing therewith, one of said pin members having a flat bearing face with a transverse recess therein and a central longitudinal groove, the other having a coacting grooved bearing face and being provided with a central portion coacting with said recess and a longitudinal rib coacting with said groove, one of said pin members having a central transverse coupling loop engaging recess on its rear side and being tapered toward each end from said recess.

7. In a link belt, the combination of a plurality of coacting links comprising a pair of body members disposed back to back and having integral coupling loops at each end, the coupling loops at one end being spaced to receive the coupling loops of an adjacent link between them, block-like facing members secured upon the sides of said body members, and coupling pins, each comprising a pair of coacting members in supporting engagement with the outer ends of the coupling loops to swing therewith, said coupling pin members having locking engagement.

8. In a link belt, the combination of a plurality of coacting links comprising a pair of body members having coacting coupling loops at the ends thereof secured together back to back, the coupling loops at one end being spaced to receive the coupling loops of an adjacent link between them, facing blocks disposed on the sides of said body members, said body members having opposed facing securing lugs on their longitudinal edges in clamping engagement with said facing members, and coupling pins each comprising a pair of coacting members in supporting engagement with the outer ends of the coupling loops to swing therewith, said coupling pin members having rocking engagement and provided with co-engaging parts whereby relative lateral and longitudinal sliding movement is prevented.

9. In a link belt, the combination of a plurality of coacting links comprising a pair of body members having coacting coupling loops at the ends thereof secured together back to back, the coupling loops at one end being spaced to receive the coupling loops of an adjacent link between them, facing blocks disposed on the sides of said body members, said body members having opposed facing securing lugs in clamping engagement with said facing members, and coupling pins each comprising a pair of coacting members in supporting engagement with the outer ends of the coupling loops to swing therewith, said coupling pin members having rocking engagement.

10. In a link belt, the combination of a plurality of coacting links comprising block-like facing members of resilient material having inwardly converging faces, strap-like body members disposed about said facing members and secured thereto, the ends of said body members being extended beyond said facing members to provide coupling loops, said coupling loops having converging arms and flat bight portions, and coupling pins, each comprising a pair of coacting members in supporting engagement with the straight bight portions of said loops to swing therewith, said coupling members having rocking engagement and being provided with co-engaging parts whereby they are supported against relative lateral and longitudinal sliding movement upon each other.

11. In a link belt, the combination of a plurality of coacting links comprising body members arranged back-to-back and having coupling loops at each end, the coupling loops at one end being spaced to receive the coupling loops of an adjacent link between them, and coupling pins, each comprising a pair of coacting members in supporting engagement with the outer ends of said coupling loops to swing therewith, one of said pin members having a central transverse coupling loop engaging recess on its rear side and being tapered toward each end from said recess.

JAMES K. DIAMOND.